April 13, 1954
C. J. McDOWALL ET AL
2,675,174
TURBINE OR COMPRESSOR ROTOR
Filed May 11, 1950
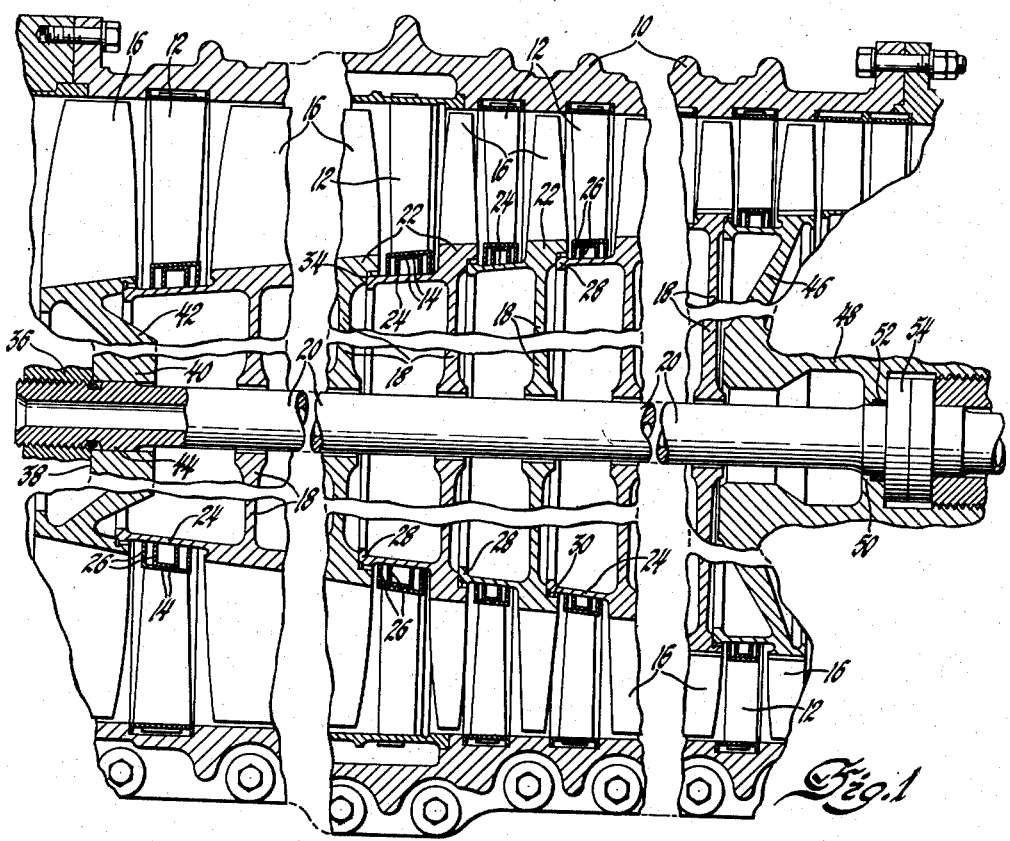
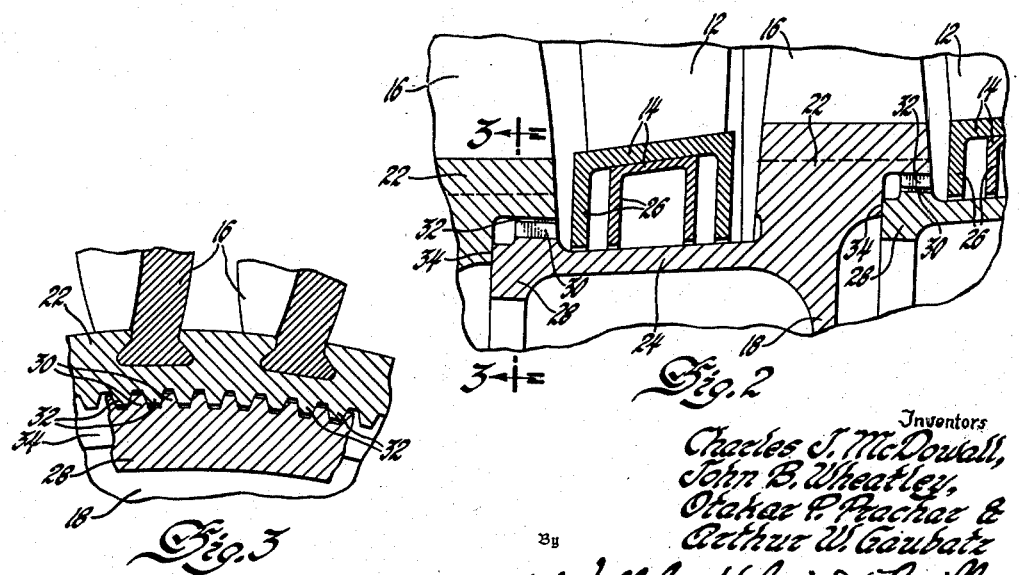
Inventors
Charles J. McDowall,
John B. Wheatley,
Otakar P. Prachar &
Arthur W. Goubatz
By
Willits, Helmig & Baillio
Attorneys

Patented Apr. 13, 1954

2,675,174

UNITED STATES PATENT OFFICE 2,675,174

TURBINE OR COMPRESSOR ROTOR

Charles J. McDowall, John B. Wheatley, Otakar P. Prachar, and Arthur W. Gaubatz, Indianapolis, Ind., assignors to General Motors Corporation, Detroit, Mich., a corporation of Delaware Application May 11, 1950, Serial No. 161,326

5 Claims. (Cl. 230—122)

This invention relates to rotors of multistage rotary machines and particularly to a means of securing together the wheels of an axial flow turbine or compressor to prevent rotational movement of one wheel relative to another and to the utilization of such a securing means as a sealing device.

The principal object of the invention is to provide a rotor construction which incorporates the advantage of the high ratio of strength to weight inherent in the drum-type rotor construction and which at the same time uses discs to exploit to best advantage the combination of drum and disc construction. This rotor construction utilizes disc rim extensions which are circumferentially splined to adjacent rotor discs to secure the discs together, thereby forming a basically drum-type construction. The drum-type of construction is carried out at the extreme periphery of the rotor where it will provide maximum rigidity in torsion and flexure and transmit torque with the least possible weight. In this design the discs function principally to reduce the tensile stresses to make feasible the required high tip speeds.

Furthermore, this rotor construction makes it easily possible to maintain concentricity to a high degree of accuracy by means of the splines. This is true because the spline teeth are preferably of an involute form, machines for developing involute teeth having been so perfected during recent years that very small tolerances in concentricity can be held. Also, the use of large diameter abutting faces makes it easily possible to maintain parallelism of the rotor discs and thus prevents a bowed or serpentine shape for the rotor asembly.

Another object of the invention is to provide an improved rotor construction wherein each aforementioned axially extended rim is also adapted to cooperate with sealing means affixed to the tips of stator blades, thereby constituting a very effective labyrinth seal to reduce fluid leakage as well as functioning as a rotor structural member. Furthermore, this lightweight rotor construction is simple and inexpensive to manufacture and assemble.

These features, which are combined in the present invention, are particularly desirable in aircraft turbines or compressors, where weight is such a major consideration.

It has formerly often been the practice in the art to secure rotor wheels together by one of the two following methods. In order to provide concentricity, one type of construction assembles turbine or compressor wheels by providing mating wheel flanges with a shrink fit, and holes for cap screws are then drilled, reamed and tapped. This type of design creates a difficult and expensive task when it becomes necessary to disassemble and rebuild the rotor. An alternative has been to secure rotor wheels together by using mating teeth on adjacent faces of wheels rather than to spline the outer and inner cylindrical surfaces of axially extending portions of the wheels as is the case in the present invention. In this type of construction the force applied through the spline teeth in transmitting torque from one wheel to another has a tendency to force the wheels apart. In order to counteract this force, a tie bolt must be preloaded to a greater extent than is necessary with the circumferential splines used in the rotor of the instant invention. Moreover, a rotor of the same weight constructed in accordance with the present invention provides a substantially more rigid structure.

Other objects and advantages of the invention will more fully appear from the following description of the preferred embodiment of the invention shown in the accompanying drawing, in which:

Figure 1 is a fragmentary longitudinal section of an axial flow compressor provided with rotor wheels embodying the invention;

Figure 2 is an enlarged fragmentary section of the rim of one of the rotor wheels shown in Figure 1, showing the formed seal and the method of securing together adjacent wheels; and Figure 3 is a fragmentary sectional view along the line 3—3 of Figure 2.

Referring to the drawing, the compressor of an axial flow turbine engine having a casing 10 is shown in Figure 1. Positioned within and secured to the casing are annular series of stator blades 12 to which are affixed sealing rings 14. Axially disposed between the rows of stator blades 12 are rotor blades 16 affixed to rotor members or discs 18, which in turn are assembled over shaft 20, which may serve as a tie rod to secure the rotor members in assembled relation, as will be hereinafter explained. During operation the elastic fluid is directed by nozzles formed by one row of stator blades to the passages defined between the adjacent rotor blades and discharged from the latter to the nozzles formed by the next annular series of stator blades.

The peripheral portion of each of these wheels is enlarged to form a rim 22 having a generally axial extension 24 on one flank. This extension is so located relative to the stator blades as to be in proximity to the stator sealing member 14 and to provide an outer surface which cooperates with the edges of the inwardly extending flanges 26 of the stator sealing means 14, thereby constituting an effective labyrinth type interstage seal. In the embodiment of the invention shown in the drawing the extension 24 is shown as having a slightly conical sealing surface. The exact contour of the extension will be governed by the radial relationship of adjacent wheel rims, characteristics of the working fluid, temperatures to which the compressor or the like is to be subjected, and other factors influenced by the proposed use of the structure.

Each rim extension 24, as best shown in Figure 2, is preferably provided with an annular rib 28 having, on its generally cylindrical outer surface, radially outwardly facing axially extending (external axial) spline teeth 30 preferably over the entire circumference of the extension. This rib also serves to lend structural rigidity to the extension. The side of each rim opposite the extension 24 is provided with radially inwardly facing axially extending (internal axial) spline teeth 32 throughout its inner circumference. This construction allows the external spline teeth 30 on the outer periphery of each extension 24 to engage the corresponding internal spline teeth 32 in the flank of an adjacent wheel, thereby preventing rotation of one wheel relative to another. It will be noted that the mating spline teeth have a tight fit, thus maintaining concentricity with adjacent discs.

It can thus be seen that the extensions 24 secured to adjacent wheel rims serve to form a basically drum-type construction with its consequent high structural strength per unit weight. Moreover, inasmuch as the connecting extensions are located at the rims of the wheels, the distances between the rotor blade tips and the points of support are sufficiently small to reduce the danger of distortion of the blades or wheels due to torsional stresses. Similarly, this construction subjects the blades to only moderate bending moments.

The rib 28 projects against the generally vertical surface 34 of the adjacent wheel rim 22 to aid in preventing relative axial movement between the wheels and to further reduce the possibility of bending of the wheels. These abutting surfaces prevent the wheel from cocking out of alignment, thus maintaining the rotor discs in parallel relationship.

Therefore, the extension 24 not only functions as part of a labyrinth seal and a structural member preventing rotational movement of one wheel relative to another, but it also serves as a spacer to aid in keeping the wheels properly positioned axially in relation to the stator blades and to each other.

The wheels or discs are held in assembled relation by means such as a collar 36 threaded to the shaft or tie rod 20 and abutting the end face 38 of the hub 40 of the heavily constructed first stage wheel 42. As shown in Figure 1, the hub 40 contacts an annular ridge 44 on the shaft for centering the rotor wheel unit on the shaft in order to provide static and dynamic balance. The last stage wheel 46 of the compressor is shown as having an axially extending hub 48 which is provided with an annular rib 50 of reduced internal diameter. This rib radially contacts the shaft and has a shoulder which abuts the face 52 of the outwardly extending flange portion 54 of the shaft 20. In this manner collar 36, hub 40, rib 50 and flange 54 cause the shaft to function as a tie rod, axially clamping the rotor wheels together into one sturdy drum-type structural unit.

It will be understood that the term "compressor," as hereinbefore used, is not intended as a limitation on the use of the invention and that the described rotor structure is generally adapted for use in turbines, compressors and similar machines where it is necessary to secure adjacent rotating members together, particularly under conditions also demanding a sealing surface between adjacent rotor wheels.

We claim:

1. In a multistage rotary machine, a shaft and a set of juxtaposed rotor members mounted on the shaft for rotation with the shaft, said members having axially extending rims each provided at one flank with a series of radially outwardly facing axially extending spline teeth and at the other flank with a series of radially inwardly facing axially extending spline teeth, the outwardly facing teeth on one rim engaging the inwardly facing teeth of an adjacent rim to lock the rims against relative rotation, the rims abutting each other to space the rotor members axially of the shaft.

2. In an axial flow turbine or compressor having a casing, and, secured thereto, an annular series of stator blades having sealing means affixed to their inner tips, a rotor structure comprising a shaft and a pair of bladed rotor wheels carried thereby, one of said wheels having a rim provided with an integral generally axially directed extension including a portion adjacent said sealing means and providing therewith an interstage seal, said extension also including a portion having a generally cylindrical outer surface provided with external spline teeth, the adjacent side of the other wheel having a generally cylindrical inner surface provided with internal spline teeth which engage said external spline teeth to lock the wheels against relative rotation.

3. An axial flow turbine or compressor comprising an outer casing, annular series of stator blades having their outer ends secured to the casing and having sealing means secured to their inner tips, a shaft, and, carried by said shaft, a set of bladed rotor wheels each having one flank of its rim provided with a generally axially directed extension in proximity to and cooperating with said stator sealing means to prevent the leakage of elastic fluid around the tips of the stator blades, said extension having an enlarged edge and a generally cylindrical outer surface portion provided with external spline teeth, the other flank of each wheel rim having a generally cylindrical inner surface provided with internal spline teeth, the external spline teeth on each of said extensions mating with the internal spline teeth on the rim of an adjacent rotor wheel to lock the wheels against relative rotation, each of said extensions projecting against an adjacent wheel to space the wheels axially of the shaft.

4. In an axial flow turbine or compressor having a casing, and, secured thereto, an annular series of stator blades having sealing means affixed to their inner tips, a rotor structure comprising a shaft and a pair of bladed rotor wheels carried thereby, one of said wheels having a rim provided with an integral generally axially directed extension adjacent said sealing means and providing therewith an interstage seal, said extension having a generally cylindrical surface provided with substantially cylindrical spline teeth, the adjacent side of the other wheel having a generally cylindrical surface provided with substantially cylindrical spline teeth which engage said first-mentioned spline teeth to lock the wheels against relative rotation.

5. An axial flow turbine or compressor comprising an outer casing, annular series of stator blades having their outer ends secured to the casing and having sealing means secured to their inner tips, a shaft, and, carried by said shaft, a set of bladed rotor wheels each having one flank of its rim provided with a generally axially directed extension in proximity to and cooperating with said stator sealing means to prevent the leakage of elastic fluid around the tips of the stator blades, said extension having an enlarged edge and a generally cylindrical surface provided with substantially cylindrical spline teeth, the other flank of each wheel rim having a generally cylindrical surface provided with substantially cylindrical spline teeth, the spline teeth on each of said extensions mating with the spline teeth on the rim of an adjacent rotor wheel to lock the wheels against relative rotation, each of said extensions projecting against an adjacent wheel to space the wheels axially of the shaft.

References Cited in the file of this patent

UNITED STATES PATENTS

| Number | Name | Date |
| --- | --- | --- |
| 1,209,918 | Westinghouse | Dec. 26, 1916 |
| 2,213,940 | Jendrassik | Sept. 3, 1940 |
| 2,308,233 | Schutte | Jan. 12, 1943 |
| 2,458,148 | Cronstedt | Jan. 4, 1949 |
| 2,458,149 | Cronstedt | Jan. 4, 1949 |
| 2,461,242 | Soderberg | Feb. 8, 1949 |
| 2,461,243 | Soderberg | Feb. 8, 1949 |
| 2,461,402 | Whitehead | Feb. 8, 1949 |
| 2,470,780 | Ledwith | May 24, 1949 |
| 2,472,062 | Boestad | June 7, 1949 |
| 2,488,867 | Judson | Nov. 29, 1949 |
| 2,557,747 | Judson | June 19, 1951 |

FOREIGN PATENTS

| Number | Country | Date |
| --- | --- | --- |
| 625,299 | Great Britain | June 24, 1949 |